Feb. 23, 1971 F. S. BARNES 3,566,371
QUANTUM STATE MEMORY
Filed Dec. 21, 1967 2 Sheets-Sheet 1
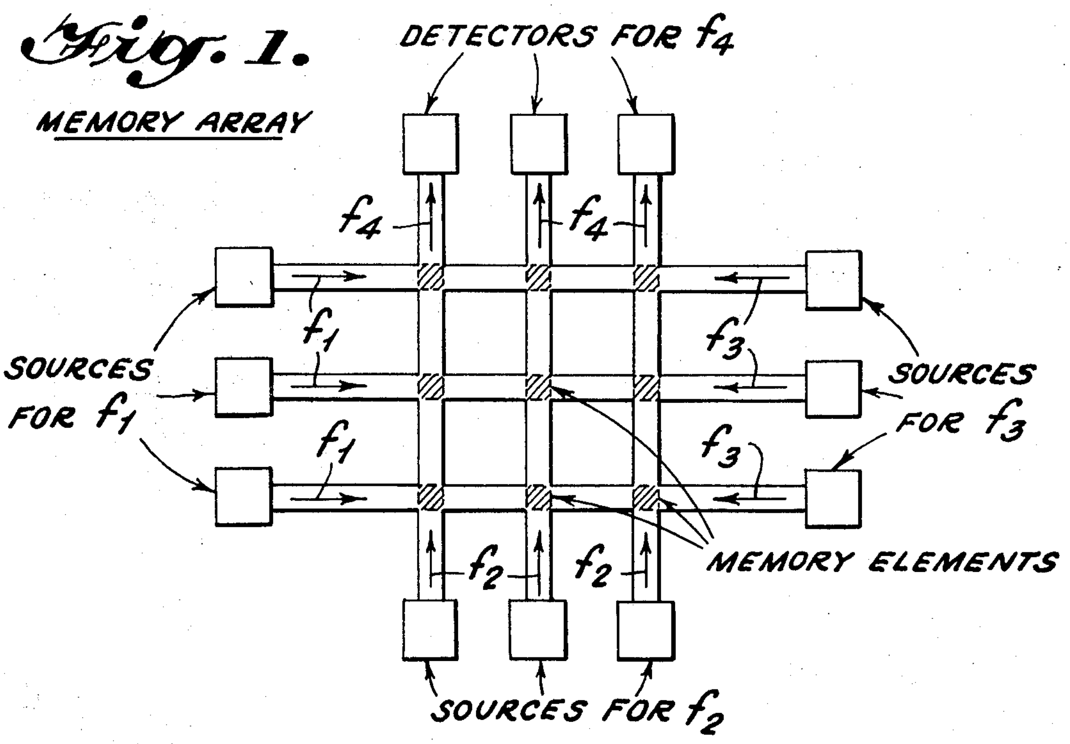
FIG. 1.
FIG. 2. DESIRED ENERGY LEVEL DIAGRAM FOR ADAPTOR DOPED ZnS
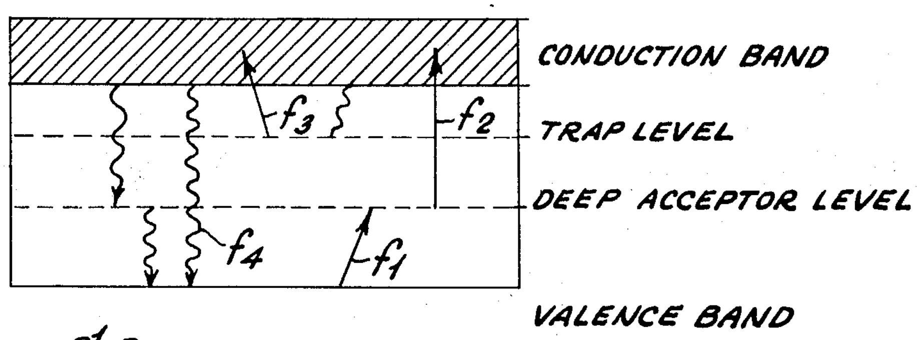
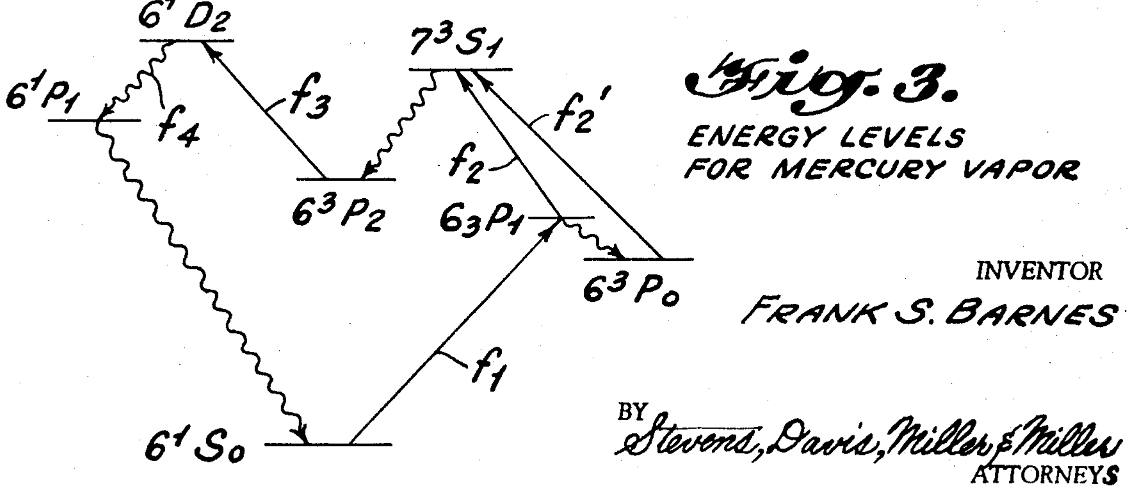
FIG. 3. ENERGY LEVELS FOR MERCURY VAPOR
INVENTOR
FRANK S. BARNES
BY Stevens, Davis, Miller & Mosher
ATTORNEYS

QUANTUM STATE MEMORY

Filed Dec. 21, 1967 2 Sheets-Sheet 2

INVENTOR
FRANK S. BARNES

BY Stevens, Davis, Miller & Mosher
ATTORNEYS

United States Patent Office 3,566,371

Patented Feb. 23, 1971

3,566,371

QUANTUM STATE MEMORY

Frank S. Barnes, 225 Continental View Drive, Boulder, Colo. 80303

Filed Dec. 21, 1967, Ser. No. 692,425
Int. Cl. G11c *13/04;* G02b *1/06*
U.S. Cl. 340—173 14 Claims

ABSTRACT OF THE DISCLOSURE

A quantum state memory is described made up of a matrix suitable for conducting electromagnetic radiation along the paths of the matrix to the intersecting points. A suitable material is located at the intersecting points characterized by two quantum states which may be generated by atoms, molecules, or ions in liquids, solids, or gases. The switching between the quantum states is accomplished by subjecting the material at the intersecting points to electromagnetic radiation at two frequencies, in one case, and at a single frequency in the opposite case. Detection means are provided to determine the quantum state.

The present invention relates to memory elements which use quantum states for storing bits of information. The quantum states involved may be generated by atoms, molecules, or ions in liquids, solids, or gases. The energy levels between these quantum states may correspond to frequencies occurring over the entire electromagnetic frequency spectrum.

It is expected that the memory elements of this kind can be manufactured cheaply and will operate at very high speeds. In the optical region, it should be possible to activate these memory elements with pulses less than $10^{-12}$ seconds long. Applications for these memory elements are expected to be found in computers, and in data processing equipment. The technical problem solved by this memory element is the development of a very high speed low cost element which can be manufactured with batch processing techniques out of relatively cheap materials in large numbers.

Other and further objects of the invention will become apparent from the following detailed description of embodiments of the invention when taken in conjunction with the appended drawings in which:

FIG. 1 shows schematically an embodiment of a memory array developed according to the principles of the present invention;

FIG. 2 shows an energy level diagram for acceptor doped ZnS;

FIG. 3 shows schematically energy levels for mercury vapor;

Figure 4:
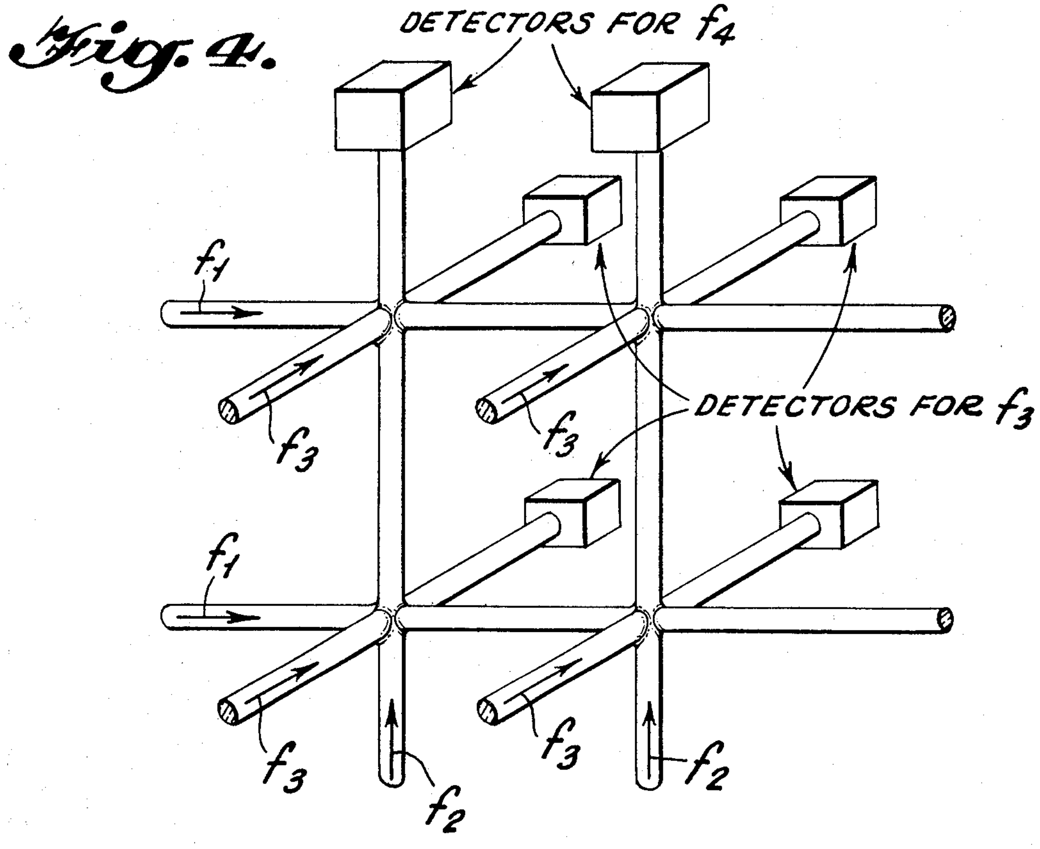
FIG. 4 shows schematically an alternate embodiment of a memory readout system developed according to the principles of the present invention.

The invention may be embodied in a variety of forms which provide a solution of the technical problem and which are based upon the principle of using quantum states as a memory element. These will be described in sequence with the most preferred scheme being discussed first.

A matrix of optical fibers or channels is laid out as shown in FIG. 1. The memory material is placed at the intersection of the glass fibers. This material may be a gas such as mercury vapor or a solid such as zinc sulfide which is doped to have the energy level diagram as shown in FIG. 2 (but is not limited to these materials). The zinc sulfide device works as follows: To set the memory element in state 1, a coincidence of light pulses at frequencies $f_1$ and $f_2$ is required in a period of time less than the lifetime of the acceptor level. The filling of the trap level with an electron will be used to define the one state of the optical memory element. The zero state is defined to be the valence band. The light at frequency $f_1$ raises an electron from the valence band to the deep acceptor level. The light at $f_2$ will raise it from the acceptor level to the conduction band where it rapidly decays spontaneously to the trap level where it is stored. The memory can be interrogated by a light pulse of $f_3$ which gives a readout signal at $f_4$ if the memory is in the trap state, and no signal at $f_4$ if it is in the valence band. The output signal, frequency $f_4$, can be recorded in a variety of ways, including placing a photoelectric detector with a filter to eliminate all other frequencies in a position shown on the diagram in FIG. 1. An interrogating pulse of frequency $f_3$ then reads out an entire row of memory elements as it propagates along the row into the detectors located as indicated on FIG. 1. The frequency $f_3$ lifts the electron from the trap level into the conduction band where it decays from the conduction band to the ground state in either one or two steps. The operation of this memory system, from a terminal point of view, is functionally similar to that used in core memory systems with destructive readout.

A second scheme for realizing a memory element of this kind is to replace the zinc sulfide element with mercury vapor. A partial energy level diagram is shown in FIG. 3. This device works in the same way as the zinc sulfide device, but the longlife state is the $6^3P_2$ state which has a lifetime of only about $10^{-3}$ or $10^{-4}$ seconds. Thus, this memory element will have to be read and reset approximately every $10^{-4}$ seconds or about every 10 to 100 cycles of computer operation. In this scheme, the frequency $f_1$ excites the atom to the $6^3P_1$ state where it may be directly excited to the $7^3S_1$ state by a $f_2$, or transferred by means of collision to the $6^3P_0$ state. From the $6^3P_0$ state, it can be excited to the $7^3S_1$ state by a frequency $f_2'$. A fraction of the electrons in the $7^3S_1$ state decay directly to the $6^3P_2$ state where they may be stored for the life of the memory element. The memory element is read out with a transition to a $6^1D_2$ state where a spontaneous decay provides the frequency $f_4$. For both these schemes, a terminal state for $f_1$ must have a lifetime which is short compared to the memory cycle time. The memory state used to store the one digit must have decay time much longer than a cycle time.

Other semiconductor materials, including CdS, zinc oxide, CSi, InAs, Si, Ge, GaAs, C, and the rare earth oxides and sulfides, may also be useful if they can be doped to have energy level diagrams similar to those shown in FIG. 2 or 3. Accptor levels in zinc sulfide may be generated by doping with As, Sb, P, N, and Bi. Alternate schemes are possible for the readout of the memory of this kind. They include, first, a detection of $f_4$ previously described with a photo diode such as one made from silicon or germanium in the geometry shown in FIG. 1. Alternately, the absorption of $f_3$ or emission at $f_4$ may be measured in a third fiber as shown in FIG. 4.

Figure 5:
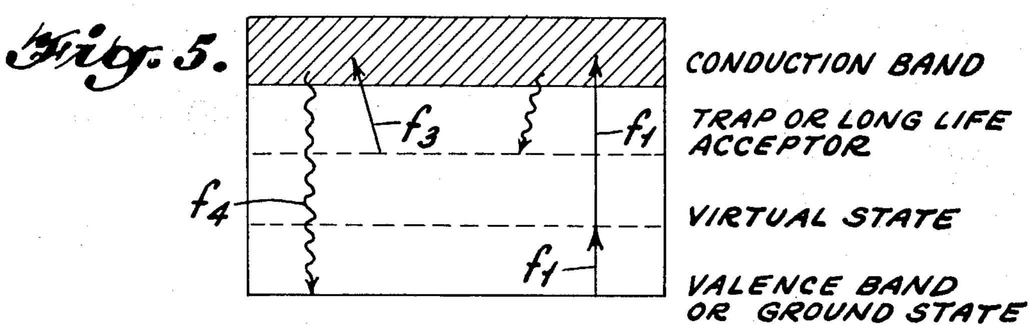
FIG. 5 shows schematically a two-quantum memory.

Variations in the method of placing an electron in a desired trap or memory state include the use of a two-quantum transition involving a virtual state as shown in FIG. 5. In this system, a coincidence of beams at $f_1$ is required in order to get sufficient energy density so that the transition probability to the conduction band is large enough to set a useful number of electrons in the desired trap state for registration of 1. A disadvantage of this two-quantum scheme for getting to the trap by means of a virtual state is the very high power density that is usually required for its operation. This method depends upon the non-linearities of the transition probabilities which go as the square of the electric field.

Figure 6:
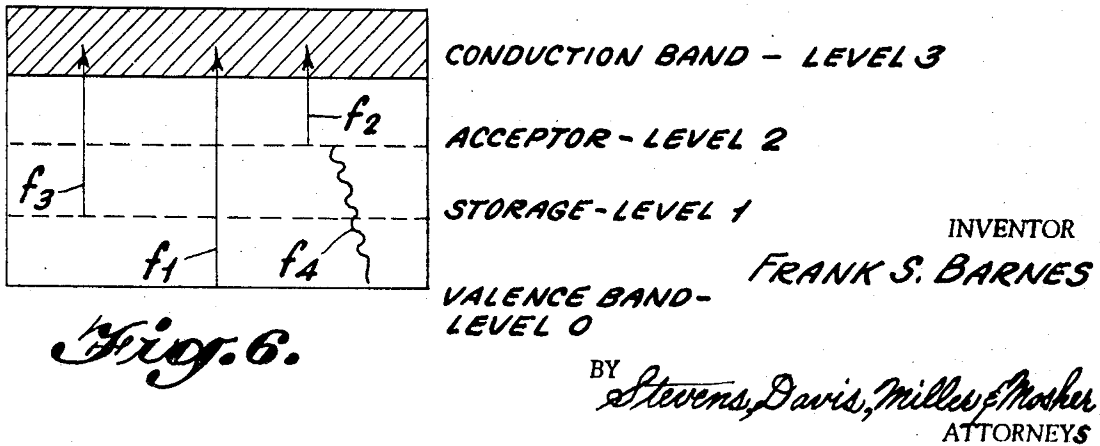
FIG. 6 shows schematically an alternate memory using blocking.

Another variation of the memory element uses a scheme in which the decay rates from the conduction band are different to the two acceptor states in the forbidden zone of a semiconducting material as shown in FIG. 6. In this scheme, radiation at frequency $f_1$ pumps electrons into the conduction band from which they decay to either level 2 or level 1. The long life state, for example level 1, is filled more slowly than level 2 which decays faster. In this case, radiation at the frequency $f_2$ blocks the flow of electrons into level 2. This allows electrons to fill level 1 setting the memory in state 1. The interrogation pulse of $f_3$ raises electrons from level 1 to the conduction band where they decay by way of transitions at $f_2$ and $f_4$. The transitions at $f_4$ can be detected as previously indicated. This scheme is, in some sense, the complement of the first scheme described and thus widens the class of materials which may make useful memory elements. However, it also requires a pump signal $f_1$ at a larger frequency than the first scheme. For some materials, this will fall in the ultraviolet.

The most desirable light sources at the present time for driving the optical version of these memory elements appear to be gallium arsenide or gallium arsenide phosphoride laser diodes which are operated in a mode locked configuration. These light sources generate extremely intense and extremely short pulses of light over a wide range of the lower optical and near infrared spectrum. Small arc lamps with short time constants will also prove to be useful. In the microwave region, klystron, Gunn diodes, and other microwave sources could be used to drive materials which satisfy the same energy level criteria previously described. These levels may be found in the parametric states of chromium in ruby.

There are a number of techniques for constructing memory elements of this kind. These include the generation of a matrix of optical fibers which are fused at the intersection and then have a pin hole photoetched in the intersection so that the active material, such as mercury vapor, zinc sulfide, etc., can be placed in the pin hole. This glass fiber matrix has the advantage of conceptual simplicity with practical difficulties in manufacturing because of the fragile nature of the materials. An alternate manufacturing technique includes the use of thin films on a glass or ceramic substrate. In this case, a low index of refraction substrate provides the mechanical strength for the structure, and a high index of refraction material, such as $TiO_2$, is plated on one surface. This thin film can be made by the deposit of Ti followed by oxidation. The intersecting optical fiber matrix is then generated by photoetching the areas between the screen fibers. The etching should also leave a hole at the intersection of two fibers which is then filled with the active memory material. Techniques for depositing this material include vapor phase crystal growth, and vacuum disposition through a mask. The substrate and the optical matrix are then covered with another film of low index of refraction material, such as $SiO_2$, so that the high index of refraction fibers form optical wave guides. An isolating sheet of absorbent material is then deposited on top of the low index refraction material. The process can be repeated, and a very large number of isolated memory elements can be generated in an extremely small volume. In this way, full three-dimensional memory arrays are obtainable. In addition to glass, quartz, etc., it is quite possible that the materials, such as germanium and silicon, may form convenient substrates or dielectric materials, particularly for the devices to operate in the infrared region of the spectrum. In some cases, the laser driving diodes and the photo detectors can be formed directly on the memory substrate with the memory elements by using additional steps of conventional semiconductor and thin film technology.

Although the invention has been shown and described with reference to specific embodiments, various changes and modifications will be evident to those skilled in the art. Such changes and modifications which do not depart from the spirit, scope, and contemplation of the invention are deemed to come within its purview.

What is claimed is:

1. A quantum state memory comprising means defining a first plurality of non-intersecting transmission paths and a second plurality of non-intersecting transmission paths with each said second transmission path intersecting all of said first transmission paths, each said transmission path having the characteristic of conducting electromagnetic radiation, material positioned at a plurality of the intersecting points of said transmission paths to intercept electromagnetic radiation being conducted therethrough, said material being characterized by a first quantum state and a second quantum state of a different energy level from the first quantum state, the second quantum state being obtainable by exposing said material in the first quantum state to electromagnetic radiation of first and second frequencies, said first quantum state being obtainable by exposing said material in the second quantum state to electromagnetic radiation of a third frequency, first and second source means to transmit electromagnetic radiation of said first and second frequencies along said first and second transmission paths, respectively, third source means to expose said material to electromagnetic radiation of said third frequency, and detection means to detect the quantum state condition of said material.

2. A quantum state memory according to claim 1 wherein said material is characterized by quantum states generated by a member of the class consisting of atoms, molecules, and ions.

3. A quantum state memory according to claim 1 wherein said material is a member selected from the group consisting of mercury vapor, ZnS, CdS, ZnO, CSi, InAs, Si, Ge, GaAs, C, rare earth oxides, rare earth sulfides suitably doped.

4. A quantum state memory according to claim 1 wherein said source means are a light source.

5. A quantum state memory according to claim 4 wherein the light source is a laser diode.

6. A quantum state memory according to claim 1 wherein the source means is a microwave generator.

7. A quantum state memory according to claim 1 wherein the transmission paths are defined by glass fibers.

8. A quantum state memory according to claim 1 wherein the transmission paths are defined by a material which conducts the electromagnetic energy.

9. A quantum state memory comprising a low index of refraction substrate, a matrix of material having a high index of refraction supported on one surface of said substrate characterized by the capability of conducting light, and a low index of refraction coating covering said matrix.

10. A quantum state memory according to claim 9 wherein the substrate is a material selected from the class consisting of glass, quartz, germanium, and silicon.

11. A quantum state memory according to claim 9 wherein said covering layer is silicon dioxide.

12. A quantum state memory according to claim 9 wherein an isolating layer is located upon said low index of refraction covering layer, said isolating layer having the characteristic of absorbing energy, and the entire structure is repeated to develop a three-dimensional array containing a plurality of matrices.

13. A quantum state memory comprising two bundles of optical fibers arranged in intersecting paths to define a matrix with the fibers being fused together at the intersecting points, and material capable of two quantum states located at the interecting points of said optical fibers in a position to intercept electromagnetic radiation being conducted by said fibers.

14. A quantum state memory according to claim 9 wherein the material having a high index of refraction is $TiO_2$.

References Cited

UNITED STATES PATENTS

| | | | |
|---|---|---|---|
| 2,905,830 | 9/1959 | Kazan | 340—173 |
| 3,360,657 | 12/1967 | Shlesinger | 340—173 |

TERRELL W. FEARS, Primary Examiner

U.S. Cl. X.R.

350—3.5, 160, 267